US012756765B2

(12) United States Patent
Sankararaman et al.

(10) Patent No.: US 12,756,765 B2
(45) Date of Patent: Oct. 6, 2026

(54) MACHINE LEARNING BASED APPROACH FOR AUTOMATICALLY RECOMMENDING PERSONALIZED ESTIMATES OF TIME NEEDED TO COMPLETE A TASK

(71) Applicant: INTUIT INC., Mountain View, CA (US)

(72) Inventors: Shankar Sankararaman, Burlingame, CA (US); Apurva Swarnakar, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 119 days.

(21) Appl. No.: 18/612,119

(22) Filed: Mar. 21, 2024

(65) Prior Publication Data

US 2025/0301049 A1 Sep. 25, 2025

(51) Int. Cl.
*G06Q 30/00* (2023.01)
*G06Q 40/12* (2023.01)
*H04L 67/50* (2022.01)

(52) U.S. Cl.
CPC ......... *H04L 67/535* (2022.05); *G06Q 40/123* (2013.12)

(58) Field of Classification Search
CPC ..................................................... H04L 67/535
USPC .......... 705/31, 1.1, 40, 335, 14.54; 709/223, 709/228
See application file for complete search history.

(56) References Cited

U.S. PATENT DOCUMENTS

2020/0125586 A1* 4/2020 Rezaeian ................ G06F 3/048
2020/0380406 A1* 12/2020 Dickens ................. G06N 20/00
2024/0061845 A1* 2/2024 Katariya ........... G06F 16/24575

OTHER PUBLICATIONS ip.com NPL Search History.*

* cited by examiner

*Primary Examiner* — John H. Holly
(74) *Attorney, Agent, or Firm* — Patterson + Sheridan, LLP

(57) ABSTRACT

A method for automatically recommending personalized estimates of amounts of time needed to complete a task include includes providing a plurality time-to-complete (TTC) models trained at different quantile levels to a machine learning model configured to select one TTC model of the plurality of TTC models as a selected TTC model to generate an estimated amount of time needed for a current user to complete the task. The method includes obtaining the estimated amount of time from the selected TTC model. The method includes obtaining feedback data regarding the estimated amount of time obtained from the selected TTC model. The method includes training the machine learning model based, at least in part, on the feedback data.

16 Claims, 4 Drawing Sheets

MACHINE LEARNING BASED APPROACH FOR AUTOMATICALLY RECOMMENDING PERSONALIZED ESTIMATES OF TIME NEEDED TO COMPLETE A TASK

INTRODUCTION

Aspects of the present disclosure relate to machine learning based techniques for automatically recommending a personalized estimate of time needed to complete a task, such as completing an electronic document having multiple sections.

BACKGROUND

Every year millions of people, businesses, and organizations around the world utilize software applications to assist with completing documents (e.g., forms) having multiple sections. For example, many individuals rely on software applications for filing their income tax returns. Software applications may be configured to allow users to complete forms, such as those used in tax returns, through a user interface.

Software applications that assist individuals with completing such a document may estimate an average time needed to complete the document and an uncertainty associated with the average estimated time. For example, software applications may estimate the average time needed to complete the document is 5 hours and may further estimate the uncertainty (e.g., a variance) associated with the estimated average time.

However, a user having prior experience filling out the document may prefer a more aggressive estimate of an amount of time (e.g., 4 hours and 30 minutes) needed to complete the task, whereas a user having no prior experience filling out the document may prefer a more conservative estimate of an amount of time (e.g., 5 hours and 30 minutes) needed to complete the task. Existing techniques for automatically estimating the amount of time needed to complete such documents do not account for features of a given user that affect whether the user prefers a more aggressive estimate of the amount of time or a more conservative estimate of the amount of time. Without a way to accurately estimate whether a user prefers the more aggressive estimate or the more conservative estimate, processor resources may be wasted in providing interventions that are not necessary, or in neglecting to provide interventions to users who may need them. For example, provided interventions may include help content that may be automatically displayed. Alternatively, or additionally, the provided interventions may include initiating a support engagement session (e.g., video call) with an expert.

Accordingly, there is a need for techniques for automatically recommending personalized estimates of an amount of time needed to complete a task, such as filling out an electronic document having multiple sections.

BRIEF SUMMARY

Aspects and advantages of embodiments of the present disclosure will be set forth in part in the following description, or may be learned from the description, or may be learned through practice of the embodiments.

A method for automatically recommending a personalized estimate of an amount of time needed to complete a task includes: providing a plurality time-to-complete (TTC) models trained at different quantile levels to a machine learning model configured to select one TTC model of the plurality of TTC models as a selected TTC model to generate an estimated amount of time needed for a current user to complete the task; obtaining the estimated amount of time from the selected TTC model; obtaining feedback data regarding the estimated amount of time obtained from the selected TTC model; and training the machine learning model based, at least in part, on the feedback data.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
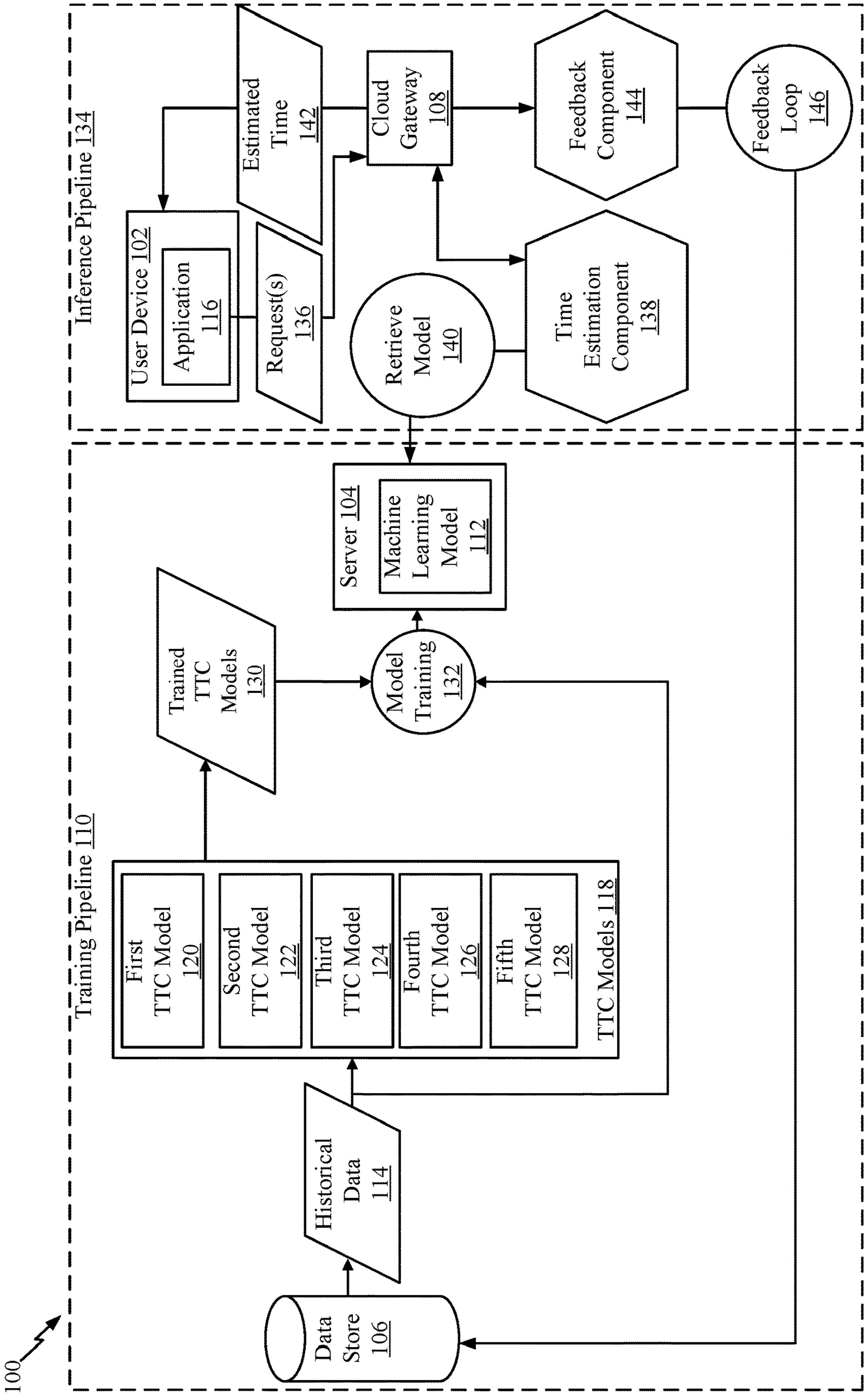
FIG. 1 depicts an example computing environment for implementing a machine learning based approach for automatically recommending a personalized estimate of an amount of time needed for a user to complete a task according to some embodiments of the present disclosure.

Example aspects of the present disclosure are directed to techniques for automatically recommending a personalized estimate of time needed to complete a task. For example, disclosed techniques include training a plurality of time-to-complete models using training data that includes an actual amount of time different users took to complete the task. The training data further includes, for each of the users, a plurality of features that are related to the task. As an example, the task may be preparing a financial document (e.g., tax return), and the plurality of features may relate to preparing the financial document, such as by including information (e.g., income, homeowner status, etc.) about the respective user that is associated with completing (e.g., populating) one or more fields of the financial document.

In some embodiments, each of the time-to-complete models (e.g., quantile regression models) may be trained at a different quantile level using a machine learning algorithm (e.g., XGBoost). For example, a first time-to-complete model may be trained at a first quantile level (e.g., 50% quantile level) to estimate an average time to complete the task. In addition, a second time-to-complete model may be trained at a second quantile level (e.g., top 25% quantile) to estimate an above-average time to complete the task and a third time-to-complete model may be trained at a third quantile level (e.g., bottom 25% quantile) to estimate a below-average time (e.g., bottom 25% quantile) to complete the task. Furthermore, in some embodiments, additional time-to-complete models may be trained. For example, a fourth time-to-complete model may be trained at a fourth quantile level (e.g., top 40% quantile) to estimate another above-average time to complete the task and a fifth time-to-complete model may be trained at a fifth quantile level (e.g., bottom 40% quantile) to estimate another below-average time to complete the task.

Once trained, the time-to-complete models may be provided as an input to a recommender model (e.g., machine learning model). The recommender model may also receive feature data for a user that is expected to complete the task. The feature data may be related to the task (e.g., preparing a financial document) the user is expected to complete.

The recommender model may select one of the time-to-complete models, and the selected time-to-complete model may output an estimate of time needed for the current user to complete the task. Furthermore, since each of the time-to-complete models is trained at a different quantile level, the estimate of time for the current user to complete the task may be personalized to the user. For example, the estimate of time may be aggressive (e.g., above-average), average, or conservative (e.g., below-average) depending on which of the time-to-complete models the recommender model selected for the user.

In some embodiments, contextual feature data (e.g., current time, current day, current month, etc.) may be provided as an input to the recommender model. In such embodiments, the recommender model may assign a relevance score to each of the time-to-complete models based, at least in part, on the contextual feature data. For example, the task may be completing a financial document (e.g., tax-return). Furthermore, based on the contextual feature data, the recommender model may determine less than a threshold amount of time (e.g., number of days) remains until a deadline to file the financial document expires and, in response, may assign a high relevance score to time-to-complete models trained at quantile levels (e.g., top 25%, top 40%, etc.) associated with estimating aggressive (e.g., above-average) times for completing the task. Additionally, in some embodiments, the recommender model may assign a low relevance score to time-to-complete models trained at quantile levels (e.g., bottom 40%, bottom 25%) associated with estimating conservative (e.g., below-average) times for completing the task. In some embodiments, the recommender model may select the time-to-complete model having the highest relevance score.

The recommender model may receive feedback data regarding the selected time-to-complete model and, more particularly, the personalized estimate of time output by the selected time-to-complete model. For example, the feedback data may indicate whether or not the user completed the task. In some embodiments, a confidence of the recommender model may be adjusted according to whether or not the user completed the task. For instance, the confidence of the recommender model may increase if the feedback data indicates the user completed the task and may decrease if the feedback data indicates the user did not complete the task. Furthermore, the recommender model may learn that the personalized estimate of time output by the selected time-to-complete model was either too aggressive or too conservative if the feedback data indicates the user did not complete the task.

In some embodiments, the feedback data may indicate an actual amount of time the user took to complete the task. In such embodiments, the recommender model may compare the actual of time the user took to complete the task against the output (e.g., personalized estimate of time needed for the user to complete the task) of the time-to-complete model selected by the recommender model. In this manner, the recommender model may determine whether the user took more time than estimated (e.g., by the selected time-to-complete model) or less time than estimated and may, in some instances, select a different time-to-complete model for a subsequent user having the same or similar features as the user. More particularly, the recommender model may select a different time-to-complete model that estimates a more aggressive or more conservative time to complete the task in an effort to minimize or eliminate a delta between the estimated amount of time needed for the subsequent user to complete the task and the actual amount of time the subsequent user will likely take to complete the task given the similarities between the user and the subsequent user.

In some embodiments, the recommender model may be configured to randomly select one of plurality of time-to-complete models. The recommender model may then receive feedback data based on the randomly selected time-to-complete model and, more particularly, the personalized estimate of time needed to complete the task. The feedback data may then be used to train the recommender model. In some embodiments, this technique for randomly selecting one of the time-to-complete models may be implemented when the recommender model is initially deployed and therefore lacks feedback data that, as discussed above, can be used to train the recommender model.

Example aspects of the present disclosure provide numerous technical effects and benefits. For instance, by automatically selecting one of a plurality of time-to-complete models trained to estimate an amount of time needed to complete the task (e.g., completing a document) at different quantile levels (e.g., top 25%, top 40%, 50%, top 60%, top 75%), the recommendation (e.g., personalized estimate of time to complete the task) provided by the recommender model according to the present disclosure is improved compared to conventional recommender models. More particularly, unlike conventional recommender models that generally recommend an average time (e.g., 50% quantile level) to complete the task, the recommender model according to the present disclosure can recommend more aggressive (e.g., top 25% or top 40%) times for users having certain features (e.g., features of users that are familiar with the task) and more conservative (e.g., top 60% or top 75%) times for users having other features (e.g., features of users that are not familiar with the task). Furthermore, by training the recommender model according to the present disclosure based on feedback data related to the selected time-to-complete model, the accuracy of recommendations provided by the recommender model can improve (e.g., become more accurate) over time. In this manner, the recommender model of the present disclosure can reduce or eliminate instances of processor resources being wasted by providing unnecessary interventions. The recommender model of the present disclosure can also eliminate or reduce instances in which the processors fail to provide interventions (e.g., automatically displaying content to assist the user with a particular aspect of the task on which the user is currently working, or initiating a live support session with an expert) to users who may need them.

Example Computing Environment for Automatically Recommending Personalized Estimates of Time Needed to Complete a Task FIG. 1 illustrates a computing environment 100 for automatically recommending personalized estimates of time needed for a user to complete a task according to embodiments of the present disclosure. The computing environment 100 includes a user device 102, a server 104, a data store 106, and a cloud gateway 108, each of which may be implemented via one or more physical computing devices, such as the computing systems discussed below with respect to FIGS. 4A and 4B. It should be appreciated that the user device 102, the server 104, the data store 106, and the cloud gateway 108, as well as other components described herein, may be communicatively coupled to one another via one or more networks (not shown). The network(s) may include, without limitation, a wide area network (WAN), a local area network (LAN), and/or a cellular network, and more generally may include any wired or wireless connection over which data may be communicated.

The computing environment includes a training pipeline 110. The training pipeline 110 includes aspects related to generating training data and then using that training data to train a plurality of time-to-complete (TTC) models 118 that, once trained, may be provided as inputs to a machine learning model 112. For example, the processes described with respect to the training pipeline 110 may be performed by a model training component running on one or more physical computing devices (e.g., the same as or separate from the server 104). Furthermore, the training pipeline 110 may represent operations that are performed initially in order to generate the machine learning model 112. Additionally, the training pipeline 110 may represent operations that are performed iteratively over time, such as in real-time and/or at regular intervals, to re-train the machine learning model 112.

In order to generate training data for training the plurality of TTC models 118, historical data 114 is retrieved from the data store 106. It should be appreciated that the data store 106 generally represents a data storage entity, such as a database or repository that stores data related to a software application, such as an application 116 that is running on the user device 102. Data related to the software application (e.g., application 116) may include data related to use of the software application by a plurality of users (e.g., that interact with the application via a plurality of user devices similar to the user device 102). For example, the historical data 114 retrieved from the data store 106 that is used to generate the training data used for training the plurality of TTC models 118 may include an amount of time taken by different users of the software application to complete a task (e.g., prepare a tax return) using the software application.

In some embodiments, the application 116 may be an accounting software application and the historical data 114 may include features for a plurality of different users that have used the application 116 to complete a task, such as preparing a financial document (e.g., tax return). The historical data 114 may include, for each of the plurality of different users, data (e.g., a timestamp) indicative of an actual amount of time a respective user of the plurality of different users took to complete the task.

The historical data 114 may be used to train each of the TTC models 118 (e.g., quantile regression models) to estimate an amount of time needed to complete the task at different quantile levels using a machine learning algorithm (e.g., a gradient boosting algorithm such as XGBoost). For example, a first TTC model 120 may be trained at a first quantile level (e.g., 50% quantile level) to estimate an average amount of time needed to complete the task. In addition, a second TTC model 122 may be trained at a second quantile level (e.g., top 25% quantile level) to estimate an above-average amount of time needed to complete the task and a third time-to-complete model 124 may be trained at a third quantile level (e.g., bottom 25% quantile level) to estimate a below-average amount of time (e.g., bottom 25% quantile) needed to complete the task. Furthermore, a fourth time-to-complete model 126 may be trained at a fourth quantile level (e.g., top 40% quantile level) to estimate another above-average amount of time to complete the task and a fifth time-to-complete model 128 may be trained at a fifth quantile level (e.g., bottom 40% quantile level) to estimate another below-average amount of time needed to complete the task. It should be appreciated that, in alternative embodiments, the training pipeline 110 may include more or fewer TTC models 118 than shown in FIG. 1.

A quantile regression model uses a type of regression analysis that estimates a conditional median (or other quantiles) of a response variable. Quantile regression is an extension or modification of linear regression, which estimates the linear relationship between a scalar response variable and one or more explanatory variables. A quantile regression model may be implemented as a tree-based machine learning model, such as a gradient boosted tree. A tree-based model (e.g., a decision tree) makes a classification by dividing the inputs into smaller classifications (at nodes), which result in an ultimate classification at a leaf. Boosting, or gradient boosting, is a method for optimizing tree models. Boosting involves building a model of trees in a stage-wise fashion, optimizing an arbitrary differentiable loss function. In particular, boosting combines weak "learners" into a single strong learner in an iterative fashion. A weak learner generally refers to a classifier that chooses a threshold for one feature and splits the data on that threshold, is trained on that specific feature, and generally is only slightly correlated with the true classification (e.g., being at least more accurate than random guessing). A strong learner is a classifier that is arbitrarily well-correlated with the true classification, which may be achieved through a process that combines multiple weak learners in a manner that optimizes an arbitrary differentiable loss function. The process for generating a strong learner may involve a majority vote of weak learners. A gradient boosted tree model may be trained using an objective function that is based on quantile regression, such as based on a particular quantile level. In some cases, a quantile level is a parameter that is selected during training of a gradient boosted tree model. In one example, one or more of TTC models 118 are gradient boosted tree models. Examples of gradient boosted tree models include XGBoost and LightGBM.

Once the plurality trained of TTC models 118 are trained, the plurality of TTC models 118 may be provided as an inputs for the machine learning model 112 at step 130. Furthermore, in some embodiments, the historical data 114 used to train the plurality of TTC models 118 may also be provided as an input to the machine learning model 112.

At model training 132, the historical data 114 and the plurality of TTC models 118 may be used to train the machine learning model 112 through a supervised learning process. In some embodiments, the supervised learning process may include providing training inputs (e.g., features of a user, contextual information associated with the user and/or a task that the user performed, and the TTC models 118) as inputs to the machine learning model 112. The machine learning model 112 may process the training inputs and output predictions (e.g., the estimated amount of time output by a respective TTC model of the TTC models 118 selected for given training inputs). In some embodiments, the output predictions may include a confidence score indicating a level of confidence for the estimated amount of time output by the TTC model the machine learning model 112 selected. The predictions are compared to the known labels (e.g., actual amount of time) associated with the training inputs to determine the accuracy of the machine learning model 112, and parameters of the machine learning model 112 are iteratively adjusted until one or more conditions are met. For instance, the one or more conditions may relate to an objective function (e.g., a cost function or a loss function) for optimizing one or more variables (e.g., model accuracy, model precision, model recall and/or the like). In some embodiments, the conditions may relate to whether the predictions produced by the machine learning model 112 based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

In some embodiments, reinforcement learning may be used in training of machine learning model 112. For example, such a reinforcement learning process may involve assigning rewards to TTC models 118 that produce time estimates that are similar to (e.g. equal to or within a threshold range of) actual amounts of time taken for completing tasks. Machine learning model 112 may use the same input features as the TTC models 118 as inputs. Additionally, machine learning model 112 may use further contextual inputs such as time of the day, day of week, month, etc. For instance, for certain types of tasks such as tax completion, the month in which the user is using the application may be a good indicator of the relevant aggression level. The reward for a given TTC model 118 may be determined based on whether the user completed the task or not, and a higher reward may be assigned if the task is completed within time predicted by the given TTC model 118 while a lower reward may be assigned if the task is not completed in the time predicted by the TTC model 118. In some cases, the highest reward may be assigned to the TTC model 118 whose prediction is the closest to the actual time taken to complete the task.

In certain embodiments, an exploration process is used to collect feedback data and/or rewards for use in training the machine learning model 112, such as in the case when little or no feedback or reward data is available. The exploration process may involve randomly selecting a TTC model 118, predicting a completion time for a task using the randomly selected TTC model 118, and then determining a reward for the TTC model 118 based on the actual amount of time that is taken to complete the task. In some cases, a bandits-style approach is taken, where completion time estimates generated by randomly selected TTC models 118 are provided to a percentage of users (e.g. 10%) and the remaining users (90%) are provided with completion time estimates generated using TTC models 118 selected based on features of the remaining users. In such an approach, rewards may be determined on an ongoing basis, such as based on comparing the completion time estimates to actual task completion times (e.g., after the estimates are provided to the users). Machine learning model 112 may be trained and/or retrained based on such feedback and/or rewards either in an online training mode (e.g., whenever such training data is determined) and/or in a batch training mode (e.g., at regular intervals, such as certain amounts of time or when certain amounts of training data are available).

The machine learning model 112 (e.g., once trained) may be deployed to the server 104, where it can be used to automatically recommend an estimated amount of time needed for a user to complete the task. In some embodiments, the machine learning model 112 may automatically select one of the TTC models 118 based, at least in part, on features associated with the user and may output the estimated amount of time generated by the selected TTC model. In some embodiments, an object is created that stores the machine learning model 112 artifact. For example, the server 104 may be a cloud server or other type of server that can be accessed in order to retrieve the machine learning model 112 (e.g., retrieve the object that includes the model artifact) for use in predicting a classification for a given transaction by a user.

In some embodiments, the cloud gateway 108 may be associated with the server 104 and may allow user devices, such as the user device 102, to receive the recommendation, such as via calls to an application programming interface (API), and the cloud gateway 108 orchestrates access to the server 104 in order to retrieve and/or otherwise use the machine learning model 112 for purposes of determining the personalized estimate of the amount of time the user needs to complete the task. It is noted that the particular architectures described herein, such as a client-server architecture, the use of a cloud server, the use of a cloud gateway, the use of an API, and/or the like are included as examples, and techniques described herein may be employed with different architectures (e.g., as a standalone system on a single device, and/or with more or fewer local and/or remote devices and/or components).

The computing environment 100 may include an inference pipeline 134. The inference pipeline 134 may include aspects related to using the machine learning model 112 (e.g., trained as described above with respect to the training pipeline 110) to automatically recommend a personalized estimate of an amount of time a user needs to complete the task. For example, the processes described with respect to the inference pipeline 134 may be performed by the application 116 and/or one or more additional local or remote components running on one or more physical computing devices (e.g., the same as or separate from the user device 102).

The user device 102 generally represents a computing device by which a user interacts with the application 116. For example, the application 116 may be a standalone application or client-side component of a client-server paradigm that also includes a server-side component with which the application 116 interacts (e.g., via API calls). Such a server-side component may run on the server 104 or a different server.

The application 116 generally represents a software application that allows a user to perform one or more workflows. In one particular example, the application 116 may be an accounting software application that allows users to perform a task, such as preparing a financial document (e.g., tax return).

The application 116 (or a remote component, such as a server-side application) may use the machine learning model 112 to automatically recommend a personalized estimate of an amount time needed for a user to complete the task. For example, the user may (e.g., via the user device 102) land on a page within the application 116 that prompts the application 116 to obtain features for the user that are relevant to the task that the user needs to complete (e.g., via interacting with a user interface of the application 116). For instance, the features may include, without limitation, information that is needed to populate one or more fields of a financial document that the user is preparing (e.g., via the user interface of the application 116). In some embodiments, the features for the user may be stored on the server 104, and the application 116 may retrieve the transactions from the server 104. In alternative embodiments, the transactions may be stored on a sever other than the server 104. In such embodiments, the application 116 may communicate with the other server to obtain the features for the user.

In addition to retrieving the transactions, the application 116 (e.g., which could be a web browser that interacts with a remote application) may request the machine learning model 112 to provide the personalized estimate of the amount of time needed for the user to complete the task. It should be appreciated that the personalized estimate of the amount of time needed for the user to complete the task may be presented in a user interface associated with the application 116. For instance, the user device 102 with which the user is interacting may include a display capable of presenting the personalized estimate of the amount of time for viewing by the user.

In some embodiments, the application 116 may send one or more requests 136 to the cloud gateway 108 in order to invoke functionality exposed by the cloud gateway 108, such as requesting the personalized estimate of the amount of time the user needs to complete the task. The request(s) 136 may prompt an object (e.g., the time estimation component 138) that includes the machine learning model 112 artifact to be retrieved. Once the machine learning model 112 has been retrieved (e.g., via the time estimation component 138 at step 140), the machine learning model 112 may be returned to the application 116 and run on the user device 102 or the machine learning model 112 may run on a device other than the user device 102, such as the server 104 (e.g., the machine learning model 112 artifact may be used to run the machine learning model 112 on the server 104 or another server and one or more results produced by the machine learning model 112 may be provided to the user device 102).

In some embodiments, the machine learning model 112 runs on the server 104, and features for the user may be provided as inputs to the machine learning model 112 are sent to the server 104 for use in recommending a personalized estimate of an amount of time needed for the user to complete the task. For example, in some embodiments, the machine learning model 112 may select one of the plurality of TTC models 118 based, at least in part, on the features of the user for whom the personalized estimate of time needed to complete the task is being requested. Furthermore, in some embodiments, the features of the user may be provided to the selected TTC model of the TTC models 118. In this manner, the selected TTC model may output an estimated time for the user to complete the task according to the features of the user.

Feedback data associated with the personalized estimate of the amount of time (e.g., estimated time 142) needed for the user to complete the task may be provided to the machine learning model 112. For example, the application 116 may provide such feedback data for use in training or re-training by interacting with the cloud gateway 108 (e.g., through an API call), and a feedback component 144 (e.g., a method invoked via the API call) may provide the feedback data to the model training 132 in a feedback loop. In certain embodiments, the feedback data on the personalized estimate of the amount of time (e.g., estimated time 142) needed for the user to complete the task may be provided to the data store 106 via a feedback loop 146. In this manner, the historical data 114 may be updated to include the feedback data and, as a result, the updated historical data 114 may be used to update the training data, which may be used to re-train the machine learning model 112.

It is noted that the particular implementation shown in FIG. 1 with the cloud gateway 108 and other specific components is included as an example, and techniques described herein may be implemented in a variety of different manners and with more or fewer components running on the same or different computing devices.

Example Operation of Machine Learning Model in Inference Phase

Figure 2:
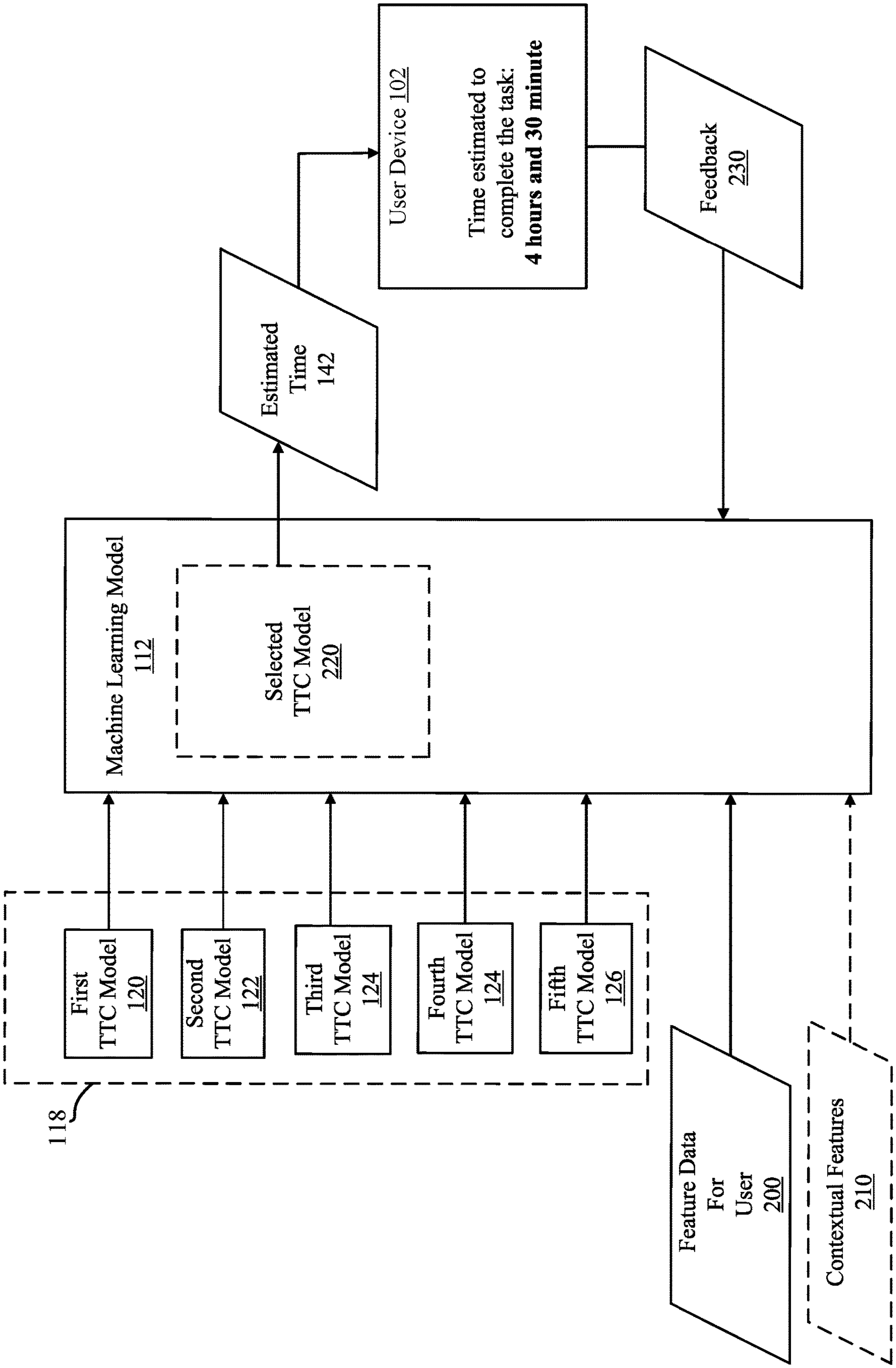
FIG. 2 depicts a machine learning model operating in an inference mode to automatically recommend a personalized estimate of time needed for a user to complete a task according to some embodiments of the present disclosure.

FIG. 2 depicts the machine learning model 112 operating in an inference phase to generate the estimated time 142 needed for a user to complete a task according to some embodiments of the present disclosure. As shown, the plurality of TTC models 118 trained according to a machine learning algorithm (e.g., XGBoost) and using historical data (e.g., the historical data 114 illustrated in FIG. 1) are provided as an input to the machine learning model 112. In addition, feature data 200 for the user may be provided as an input to the machine learning model 112.

The feature data 200 for the user may include one or more features specific to the user and necessary for the task the user needs to complete. For example, as previously mentioned, the task may include completing a financial document (e.g., tax return) and the feature data 200 for the user may include information that is specific to the user and needed to complete (e.g., populate) one or more fields of the financial document. In some embodiments, contextual features 210 may also be provided as an input to the machine learning model 112. Examples of the contextual features may include, without limitation, a current time, day, month, year, etc.

The machine learning model 112 may select one of the plurality of TTC models 118 as a selected TTC model 220. In some embodiments, the selection of one of the plurality of TTC models 118 by the machine learning model 112 may be random. In alternative embodiments, the machine learning model 112 may select one of the plurality of TTC models 118 as the selected TTC model 220 based, at least in part, on the feature data 200 for the user and/or the contextual features 210.

In such embodiments, the machine learning model 112 may assign a relevance score to each of the time-to-complete models 118 based on the contextual feature data. For example, the task may be completing a financial document (e.g., tax-return). Furthermore, based on the contextual features 210, the machine learning model 112 may determine less than a threshold amount of time (e.g., number of days) remains until a deadline to file the financial document expires and, in response, may assign a high relevance score to time-to-complete models trained at quantile levels (e.g., top 25%, top 40%, etc.) associated with estimating aggressive (e.g., above-average) times for completing the task. Additionally, in some embodiments, the machine learning model 112 may assign a low relevance score to time-to-complete models trained at quantile levels (e.g., bottom 40%, bottom 25%) associated with estimating conservative (e.g., below-average) times for completing the task. In some embodiments, the recommender model may select the time-to-complete model having the highest relevance score.

The selected TTC model 220 may output the estimated time 142 needed for the user to complete the task. In some embodiments, the selected TTC model 220 may determine the estimated time 142 based, at least in part, the feature data 200 for the user. For example, the feature data 200 for the user may be provided as an input to the selected TTC model 220 and the selected TTC model 220 may process the feature data 200 for the user to generate the estimated time 142 the user needs to complete the task. The estimated time 142 may be displayed on a display of the user device 102. For example, the estimated time 142 output by the selected TTC model 220 may be 4 hours and 30 minutes and may, as shown, be displayed on the display of the user device 102.

The machine learning model 112 may receive feedback data 230 regarding the selected TTC model 220 and, more particularly, the estimated time 142 output by the selected TTC model 220. For example, the feedback data 230 may indicate whether or not the user completed the task. In some embodiments, a confidence of the machine learning model 112 may be adjusted according to whether or not current user completed the task. For instance, the confidence of the machine learning model 112 may be incremented if the feedback data 230 indicates the current user completed the task and may be decremented if the feedback data 230 indicates the current user did not complete the task. Furthermore, the machine learning model 112 may learn that the estimated time 142 output by the selected time-to-complete model 220 was either too aggressive or too conservative if the feedback data 230 indicates the current user did not complete the task.

In some embodiments, the feedback data 230 may indicate an actual amount of time the user took to complete the task. In such embodiments, the machine learning model 112 may compare the actual of time the current user took to complete the task against the output (e.g., the estimated time 142) of the selected TTC model 220. In this manner, the machine learning model 112 may determine whether the user took more time than the estimated time 142 or less time than the estimated time 142. In either instance, the machine learning model 112 may learn from the feedback data 230 and may, in some instances, select a different TTC model for a subsequent user having the same or similar features as the current user. More particularly, the machine learning model 112 may select a different TTC model that outputs a more aggressive or more conservative estimated time to complete the task in an effort to minimize or eliminate a delta (e.g., difference) between the estimated time needed for the subsequent user to complete the task and the actual amount of time the subsequent user takes to complete the task.

Figure 3:
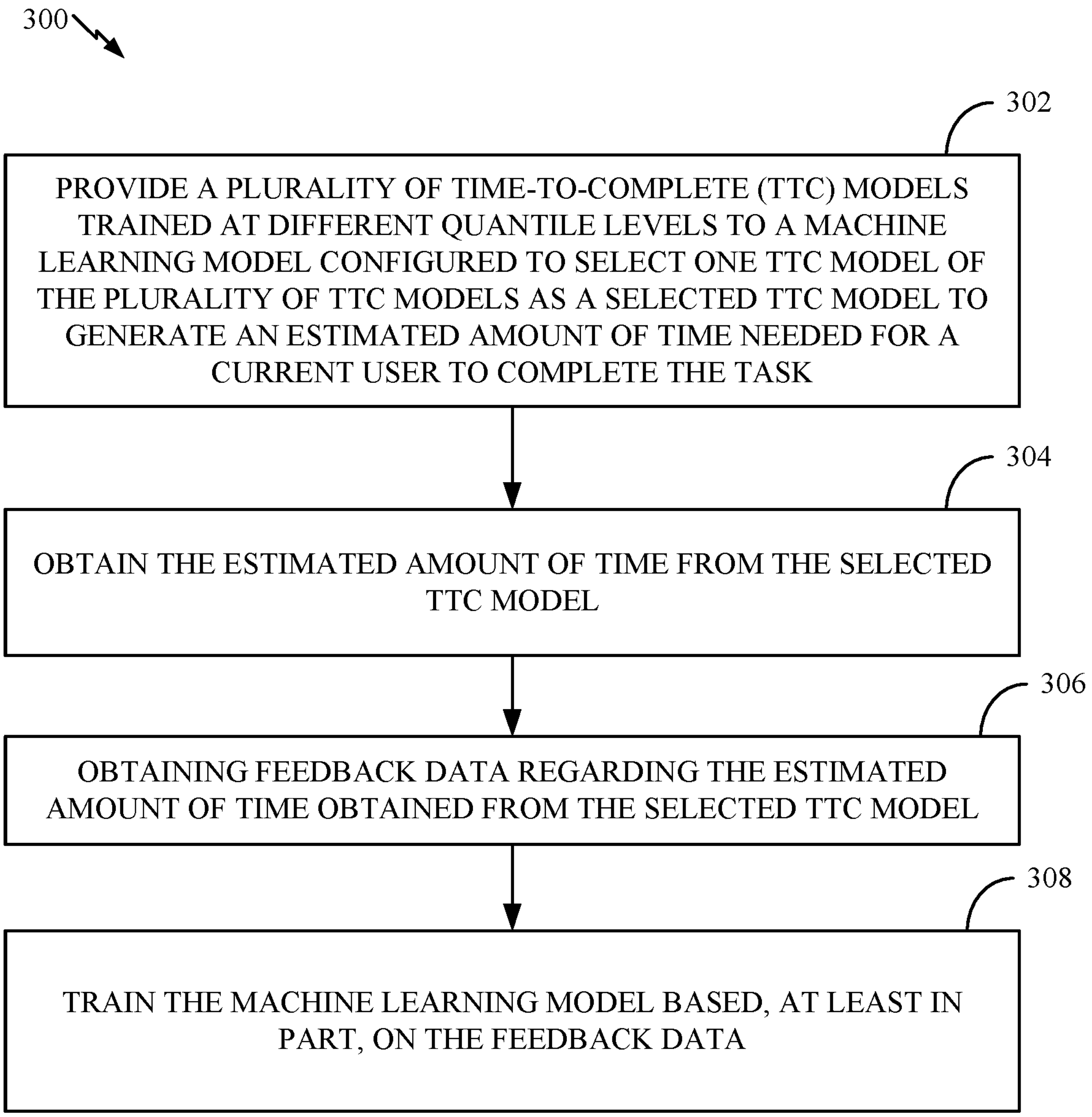
FIG. 3 depicts a flow diagram of a method of a machine learning based approach for automatically recommending a personalized estimate of an amount of time needed to complete a task according to some embodiments of the present disclosure.

Example Operations for Automatically Recommending a Personalized Estimate of an Amount of Time Needed for a User to Complete a Task FIG. 3 is a flow diagram of an example operations 300 of a machine learning based approach for automatically recommending a personalized estimate of an amount of time needed for a user to perform a task according to some embodiments of the present disclosure. The operations 300 may be performed by instructions executing on a processor of a server (such as the server 104 of FIG. 1).

Operation 302 includes providing a plurality of time-to-complete (TTC) models (e.g., TTC models 118 illustrated in FIG. 2) trained at different quantile levels to a machine learning model (e.g., machine learning model 112 illustrated in FIG. 2) configured to select one TTC model of the plurality of TTC models as a selected TTC model to generate an estimated amount of time needed for a current user to complete the task. For instance, the plurality of TTC models trained at the different quantile levels may include a first TTC model trained at a first quantile level (e.g., 50% quantile level) to estimate an average time needed to complete the task, a second TTC model trained at a second quantile level (e.g., top 25% quantile level) to estimate an above-average time needed to complete the task, and a third TTC model trained at a third quantile level (e.g., top 70% quantile level) to estimate a below-average time needed to complete the task.

Operation 304 includes obtaining the estimated amount of time from the selected TTC model determined at operation 302. For instance, the estimated amount of time may be the average estimated time needed to complete the task if the selected TTC model is the first TTC model. Conversely, the estimated amount of time may be a more aggressive time (e.g., the above-average time) or a more conservative time (e.g., below-average time) if the selected TTC model corresponds to the second TTC model or the third TTC model, respectively.

Operation 306 includes obtaining feedback data regarding the estimated amount of time obtained at operation 304. For instance, in in some embodiments, the feedback data may indicate an actual amount of time the current user took to complete the task. In alternative embodiments, the feedback data may indicate whether or not the user completed the task.

Operation 308 includes training the machine learning model based, at least in part, on the feedback data obtained at operation 306. For instance, in some embodiments, training the machine learning model may include incrementing a confidence variable associated with the machine learning model based on the feedback data. More specifically, the confidence variable may be decremented if the feedback data indicates the user did not complete the task. In this manner, the machine learning model may become less confident in its predictions due, at least in part, to the feedback data indicating the most-recent prediction (e.g., estimated completion time obtained at operation 304) being inaccurate. Alternatively, the confidence variable associated with the machine learning model may be incremented if the feedback data indicates the user did complete the task. In this manner, the machine learning may become more confident in its predictions due, at least in part, to the feedback data indicating the most-recent prediction (e.g., estimated completion time obtained at operation 304) being accurate.

Example Computing Systems

Figure 4A:
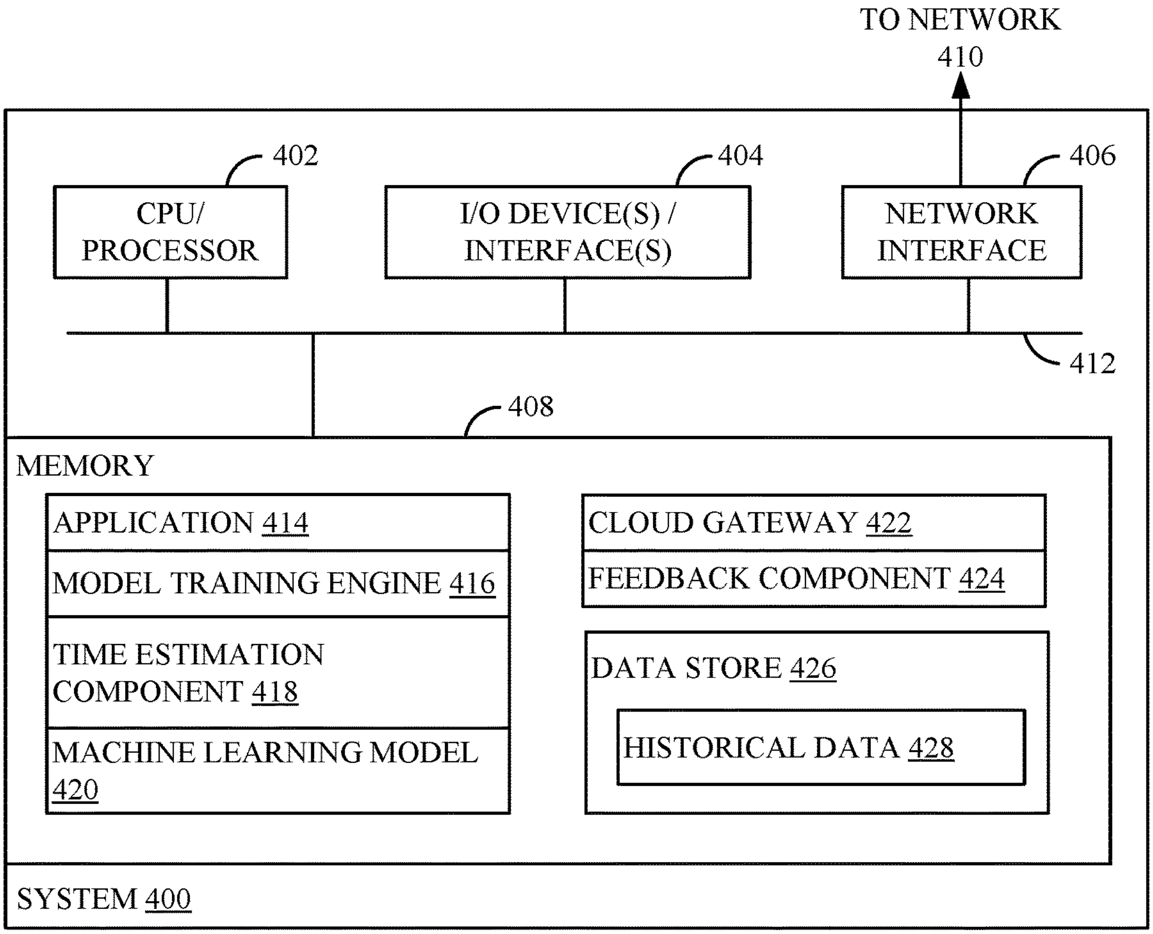
FIGS. 4A and 4B depict example processing systems according to some embodiments of the present disclosure.

FIG. 4A illustrates an example computing system 400 with which embodiments of the disclosure related to automatically recommending a personalized estimate of an amount of time needed for a user to complete a task may be implemented. For example, the computing system 600 may be representative of the server 104 of FIG. 1.

The computing system 400 includes a central processing unit (CPU) 402, one or more I/O device interfaces 404 that may allow for the connection of various I/O devices 404 (e.g., keyboards, displays, mouse devices, pen input, etc.) to the computing system 400, a network interface 406, a memory 408, and an interconnect 412. It is contemplated that one or more components of the computing system 400 may be located remotely and accessed via a network 410. It is further contemplated that one or more components of the computing system 400 may include physical components or virtualized components.

The CPU 402 may retrieve and execute programming instructions stored in the memory 408. Similarly, the CPU 402 may retrieve and store application data residing in the memory 408. The interconnect 412 transmits programming instructions and application data, among the CPU 402, the I/O device interface 404, the network interface 406, the memory 408. The CPU 402 is included to be representative of a single CPU, multiple CPUs, a single CPU having multiple processing cores, and other arrangements.

Additionally, the memory 408 is included to be representative of a random access memory or the like. In some embodiments, the memory 408 may include a disk drive, solid state drive, or a collection of storage devices distributed across multiple storage systems. Although shown as a single unit, the memory 408 may be a combination of fixed and/or removable storage devices, such as fixed disc drives, removable memory cards or optical storage, network attached storage (NAS), or a storage area-network (SAN).

As shown, the memory 408 includes application 414, time estimation component 418, machine learning model 420, cloud gateway 422, feedback component 424 and data store 426, which may be representative of application 116, model training 132, time estimation component 138, machine learning model 112, cloud gateway 108, feedback component 144, and data store 106 of FIG. 1. Furthermore, the historical data 428 included in the data store 426 may include, for example, the historical data 114 of FIG. 1. The memory 408 further includes a model training engine 416, which may perform operations described herein for training the machine learning model 420, such as corresponding to the training pipeline 110 of FIG. 1.

Figure 4B:
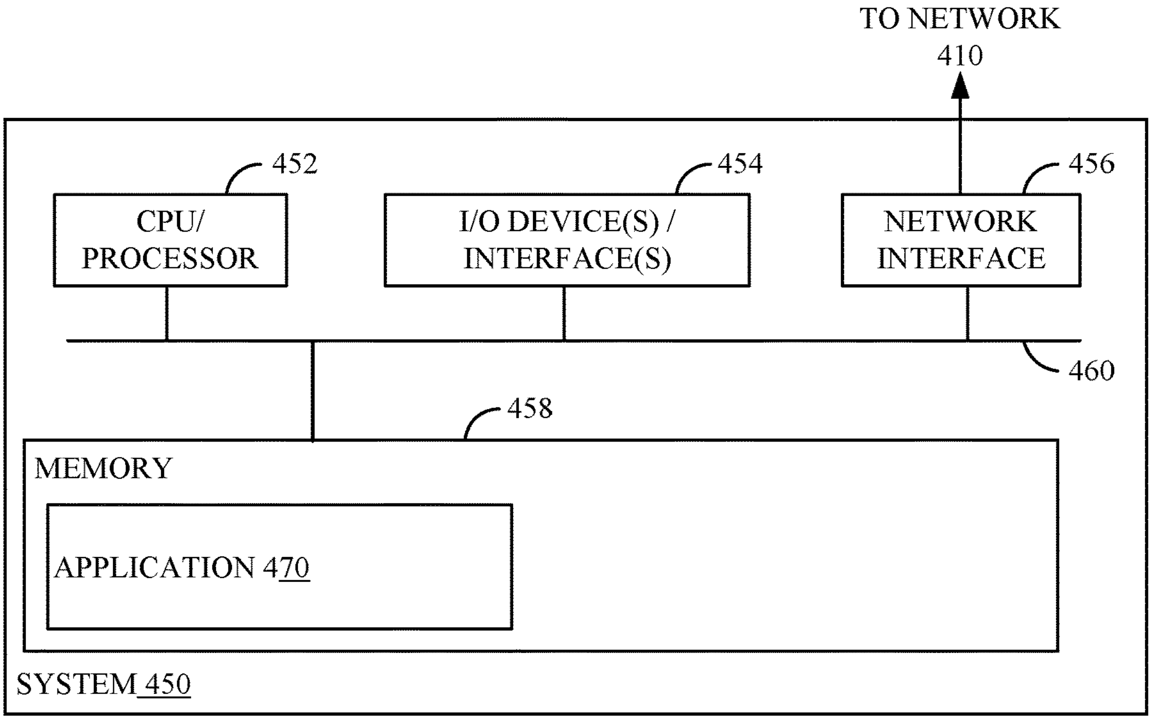

FIG. 4B illustrates an example computing system 450 with which embodiments of the disclosure related to automatically recommending a personalized estimate of an amount of time needed for a user to complete a task may be implemented. For example, the computing system 450 may be representative of the user device 102 of FIG. 1.

The computing system 450 includes a central processing unit (CPU) 452, one or more I/O device interfaces 454 that may allow for the connection of various I/O devices 454 (e.g., keyboards, displays, mouse devices, pen input, etc.) to the computing system 450, a network interface 456, a memory 458, and an interconnect 460. It is contemplated that one or more components of the computing system 450 may be located remotely and accessed via the network 410. It is further contemplated that one or more components of the computing system 450 may include physical components or virtualized components.

The CPU 462 may retrieve and execute programming instructions stored in the memory 458. Similarly, the CPU 452 may retrieve and store application data residing in the memory 458. The interconnect 460 transmits programming instructions and application data, among the CPU 452, the I/O device interface 454, the network interface 456, the memory 458. The CPU 452 is included to be representative of a single CPU, multiple CPUs, a single CPU having multiple processing cores, and other arrangements.

Additionally, the memory 458 is included to be representative of a random access memory or the like. In some embodiments, the memory 458 may include a disk drive, solid state drive, or a collection of storage devices distributed across multiple storage systems. Although shown as a single unit, the memory 458 may be a combination of fixed and/or removable storage devices, such as fixed disc drives, removable memory cards or optical storage, network attached storage (NAS), or a storage area-network (SAN).

As shown, the memory 458 may include a software application 470, such as the application 116 discussed above with reference to FIG. 1.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically recommending personalized estimates of amounts of time needed to complete a task, the method comprising:

providing a plurality time-to-complete (TTC) models trained at different quantile levels to a machine learning model configured to select one TTC model of the plurality of TTC models as a selected TTC model to generate an estimated amount of time needed for a current user to complete the task, wherein each TTC model of the plurality of TTC models comprises a quantile regression model trained using historical data that includes an actual amount of time taken by different users to complete the task;

obtaining the estimated amount of time from the selected TTC model;

obtaining feedback data regarding the estimated amount of time obtained from the selected TTC model, wherein the feedback data indicates whether the current user completed the task; and training the machine learning model based, at least in part, on the feedback data, wherein the training comprises:

in response to the feedback data indicating the current user completed the task, training the machine learning model comprises incrementing a confidence variable associated with the machine learning model; or in response to the feedback data indicating the current user did not complete the task, training the machine learning model comprises decrementing the confidence variable associated with the machine learning model; and displaying, on a display of a user device, the estimated amount of time obtained from the selected TTC model.

2. The method of claim 1, wherein the feedback data comprises an actual amount of time the current user took to complete the task.

3. The method of claim 2, wherein:

when the actual amount of time the current user took to complete the task differs from the estimated amount of time obtained from the selected TTC model, the training comprises training the machine learning model to select a different TTC model as the selected TTC model for a subsequent user having one or more features in common with the current user.

4. The method of claim 1, further comprising:

providing one or more contextual features as an input to the machine learning model; and providing feature data for the current user as an input to the machine learning model.

5. The method of claim 4, wherein the one or more contextual features comprise at least one of a current time, a current day, or a current month.

6. The method of claim 5, wherein the machine learning model is configured to assign a relevancy score to each of the TTC models based, at least in part, on the one or more contextual features; and select the one TTC model of the plurality of TTC models as the selected TTC model based, at least in part, on the relevancy score assigned to each of the TTC models, wherein the relevancy score for the one TTC model is higher than the relevancy score for every other TTC model of the plurality of TTC models.

7. The method of claim 4, wherein the machine learning model is configured to select the one TTC model as the selected TTC model based on at least one of the feature data for the current user or the one or more contextual features.

8. The method of claim 1, wherein the plurality of TTC models comprise:

a first TTC model trained at a first quantile level to estimate an average time for completing the task;

a second TTC model trained at a second quantile level to estimate an above-average time for completing the task; and a third TTC model trained at a third quantile level to estimate a below-average time for completing the task.

9. A system for automatically recommending personalized estimates of amounts of time needed to complete a task, the system comprising:

one or more processors; and one or more memory configured to store computer executable instructions that, when executed by the one or more processors, cause the one or more processors to:

provide a plurality time-to-complete (TTC) models trained at different quantile levels to a machine learning model configured to select one TTC model of the plurality of TTC models as a selected TTC model to generate an estimated amount of time needed for a current user to complete the task, wherein each TTC model of the plurality of TTC models comprises a quantile regression model trained using historical data that includes an actual amount of time taken by different users to complete the task;

obtain the estimated amount of time from the selected TTC model;

obtain feedback data regarding the estimated amount of time obtained from the selected TTC model, wherein the feedback data indicates whether the current user completed the task; and train the machine learning model based, at least in part, on the feedback data, wherein to train the machine learning model the instructions cause the one or more processors to:

in response to the feedback data indicating the current user completed the task, increment a confidence variable associated with the machine learning model; or in response to the feedback data indicating the current user did not complete the task, decrement the confidence variable associated with the machine learning model; and display, on a display of a user device, the estimated amount of time obtained from the selected TTC model.

10. The system of claim 9, wherein the feedback data comprises an actual amount of time the current user took to complete the task.

11. The system of claim 10, when the actual amount of time the current user took to complete the task differs from the estimated amount of time obtained from the selected TTC model, the one or more processors train the machine learning model to select a different TTC model as the selected TTC model for a subsequent user having one or more features in common with the current user.

12. The system of claim 11, wherein the plurality of TTC models comprise:

a first TTC model trained at a first quantile level to estimate an average time for completing the task;

a second TTC model trained at a second quantile level to estimate an above-average time for completing the task; and a third TTC model trained at a third quantile level to estimate a below-average time for completing the task.

13. The system of claim 9, wherein the computer executable instructions, when executed by the one or more processors, further cause the one or more processors to:

provide one or more contextual features as an input to the machine learning model; and provide feature data for the current user as an input to the machine learning model.

14. The system of claim 13, wherein the machine learning model is configured to select the one TTC model as the selected TTC model based on at least one of the feature data for the current user or the one or more contextual features.

15. The system of claim 14, wherein the machine learning model is configured to assign a relevancy score to each of the TTC models based, at least in part, on the one or more contextual features; and select the one TTC model of the plurality of TTC models as the selected TTC model based, at least in part, on the relevancy score assigned to each of the TTC models, wherein the relevancy score for the one TTC model is higher than the relevancy score for every other TTC model of the plurality of TTC models.

16. A non-transitory computer-readable medium comprising instructions to be executed in a computer system to automatically recommending personalized estimates of amounts of time needed to complete a task, wherein the instructions when executed in the computer system cause the computer system to:

provide a plurality time-to-complete (TTC) models trained at different quantile levels to a machine learning model configured to select one TTC model of the plurality of TTC models as a selected TTC model to generate an estimated amount of time needed for a current user to complete the task, wherein each TTC model of the plurality of TTC models comprises a quantile regression model trained using historical data that includes an actual amount of time taken by different users to complete the task;

obtain the estimated amount of time from the selected TTC model;

obtain feedback data regarding the estimated amount of time obtained from the selected TTC model, wherein the feedback data indicates whether the current user completed the task; and train the machine learning model based, at least in part, on the feedback data, wherein to train the machine learning model the instructions cause the computing system to:

in response to the feedback data indicating the current user completed the task, increment a confidence variable associated with the machine learning model; or in response to the feedback data indicating the current user did not complete the task, decrement the confidence variable associated with the machine learning model; and display, on a display of a user device, the estimated amount of time obtained from the selected TTC model.

* * * * *